United States Patent
Watanabe et al.

(10) Patent No.: US 12,079,728 B2
(45) Date of Patent: Sep. 3, 2024

(54) DEVICE, METHOD, AND PROGRAM FOR QUANTITATIVELY ANALYZING STRUCTURE OF A NEURAL NETWORK

(71) Applicant: NIPPON TELEGRAPH AND TELEPHONE CORPORATION, Tokyo (JP)

(72) Inventors: Chihiro Watanabe, Tokyo (JP); Kaoru Hiramatsu, Tokyo (JP); Kunio Kashino, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 1027 days.

(21) Appl. No.: 16/980,380

(22) PCT Filed: Mar. 7, 2019

(86) PCT No.: PCT/JP2019/009114
§ 371 (c)(1),
(2) Date: Sep. 12, 2020

(87) PCT Pub. No.: WO2019/176731
PCT Pub. Date: Sep. 19, 2019

(65) Prior Publication Data
US 2021/0248422 A1 Aug. 12, 2021

(30) Foreign Application Priority Data
Mar. 14, 2018 (JP) .................................. 2018-047140

(51) Int. Cl.
*G06F 18/21* (2023.01)
*G06F 18/23* (2023.01)
(Continued)

(52) U.S. Cl.
CPC ........... *G06N 3/084* (2013.01); *G06F 18/217* (2023.01); *G06F 18/23* (2023.01);
(Continued)

(58) Field of Classification Search
CPC ...... G06N 3/084; G06N 20/00; G06F 18/217; G06F 18/23; G06F 17/18; G06V 30/19173; G06V 30/10
See application file for complete search history.

(56) References Cited

U.S. PATENT DOCUMENTS 6,134,537 A * 10/2000 Pao .................... G06F 18/21355
706/26
2003/0191728 A1* 10/2003 Kulkarni ................ G06N 3/086
706/31
(Continued)

FOREIGN PATENT DOCUMENTS

JP H07120349 B2 * 12/1995 ............. G06F 15/18

OTHER PUBLICATIONS

Watanabe, Chihiro, et al., "Modular representation of layered neural networks," Neural Networks 97 (2018) 62-73.

*Primary Examiner* — K C Chen (57) ABSTRACT

The present invention enables the structure of a neural network to be quantitatively analyzed. An analyzing unit calculates, for each of combinations of a dimension of input data and a cluster, a sum of squared errors between an output of each unit belonging to the cluster when a value of the dimension of the input data is replaced with an average value of the dimension of the input data included in learning data and an output of each unit belonging to the cluster for the input data before replacement as a relationship between the combinations, and calculates, for each of combinations of the cluster and a dimension of output data, a squared error between the value of the dimension of the output data when an output value of each unit belonging to the cluster is
(Continued)

replaced with an average output value of each unit of the cluster when the input data included in the learning data was input and the value of the dimension of the output data before replacement as a relationship between the combinations.

14 Claims, 4 Drawing Sheets

(51) Int. Cl.
  *G06N 3/084* (2023.01)
  *G06V 30/182* (2022.01)
  *G06V 30/19* (2022.01)
  *G06V 30/10* (2022.01)

(52) U.S. Cl.
  CPC .... *G06V 30/1823* (2022.01); *G06V 30/19173* (2022.01); *G06V 30/10* (2022.01)

(56) References Cited

U.S. PATENT DOCUMENTS

| | | | | |
|---|---|---|---|---|
| 2006/0224533 A1* | 10/2006 | Thaler | G06N 3/105 | 706/15 |
| 2007/0094168 A1* | 4/2007 | Ayala | G06N 3/105 | 706/15 |
| 2020/0110930 A1* | 4/2020 | Simantov | G06N 20/00 | |
| 2023/0214458 A1* | 7/2023 | Marsden | G06V 40/11 | 382/157 |

* cited by examiner

ALGORITHM 1 Noisy backprogagation based on degree of contribution of each cluster to output class 1: $T$ is number of iterations of algorithm, $D$ is number of layers of neural network, and $\lambda$ is hyperparameter.
2: Class to which unit $j$ belongs is $g_j$.
3: Initial values of connection weight $\omega = \{\omega_{ij}^d\}$ and bias $\theta = \{\theta_j^d\}$ are determined randomly.
4: $\eta(t) \propto 1/t$.
5: for $t = 1$ to $T$ do
6:    Number of pieces of learning data is $m$, and one sample is selected randomly from a uniform distribution on $\{1, 2, \cdots, m\}$. This sample is $(x, y)$, and output class (that is, corresponding output dimension) to which this sample belongs is $r$.
7:    (1) Calculate output of each unit: Output of $j$-th unit in layer having depth $d$ is $o_j^d$.
8:    $o_j^1 \leftarrow x_j + dx_j,\ dx_j \sim \mathcal{N}(0, \sigma_{g_j, r})$.
9:    for $d = 2$ to $D$ do
10:      $o_j^d \leftarrow \sigma(\sum_i \omega_{ij}^{d-1} o_i^{d-1} + \theta_j^d) + do_j,\ do_j \sim \mathcal{N}(0, \sigma_{g_j, r})$.
11:    end for
12:    (2) Update connection weight $\omega_{ij}^d$ and bias $\theta_j^d$ on the basis of backpropagation. $\epsilon$ is positive small value.
13:    $\delta_j^D \leftarrow (o_j^D - y_j)(o_j^D(1 - o_j^D) + \epsilon)$.
14:    $\Delta\omega_{ij}^{D-1} \leftarrow -\eta(t)(\delta_j^D o_i^{D-1} + \lambda\ \mathrm{sgn}(\omega_{ij}^{D-1}))$.
15:    $\Delta\theta_j^D \leftarrow -\eta(t)\delta_j^D$.
16:    for $d = D - 1$ to $2$ do
17:      $\delta_j^d \leftarrow \sum_{j'} \delta_{j'}^{d+1} \omega_{jj'}^d (o_j^d(1 - o_j^d) + \epsilon)$.
18:      $\Delta\omega_{ij}^{d-1} \leftarrow -\eta(t)(\delta_j^d o_i^{d-1} + \lambda\ \mathrm{sgn}(\omega_{ij}^{d-1}))$.
19:      $\Delta\theta_j^d \leftarrow -\eta(t)\delta_j^d$.
20:    end for
21:    $\omega_{ij}^d \leftarrow \omega_{ij}^d + \Delta\omega_{ij}^d$.
22:    $\theta_j^d \leftarrow \theta_j^d + \Delta\theta_j^d$.
23: end for

Fig. 4

DEVICE, METHOD, AND PROGRAM FOR QUANTITATIVELY ANALYZING STRUCTURE OF A NEURAL NETWORK

CROSS-REFERENCE TO RELATED APPLICATIONS

This application is a U.S. 371 Application of International Patent Application No. PCT/JP2019/009114, filed on 7 Mar. 2019, which application claims priority to and the benefit of JP Application No. 2018-047140, filed on 14 Mar. 2018, the disclosures of which are hereby incorporated herein by reference in their entireties.

TECHNICAL FIELD

The present invention relates to an analyzing device, method, and program, and particularly, to an analyzing device, method, and program for analyzing a structure of a neural network.

BACKGROUND ART

Techniques of extracting a structure that simplifies an original neural network by applying network analysis to a multilayer neural network learned from data and converting the structure in a more easily analyzable form are known. More specifically, these techniques realize simplification of an original connection structure by finding out a group (also referred to as a cluster or a community) of units having a connection pattern similar to the units of adjacent layers for the units of respective layers of a multilayer neural network according to a predetermined algorithm.

CITATION LIST

Non Patent Literature

[NPL 1] Watanabe. C, Hiramatsu. K, and Kashino. K. Modular representation of layered neural networks. Neural Networks, Vol. 97, pp. 62-73, 2018.

SUMMARY OF THE INVENTION

Technical Problem

Due to the above-described existing techniques, although it is possible to extract a structure that simplifies the structure of a multilayer neural network, these techniques have the following problems. First, a method of quantitatively knowing the role of each cluster in the cluster structure of a multilayer neural network extracted by the above-described technique is not known. That is, with these techniques, it is not possible to know how much each cluster looks at each part of input data and how much each cluster is used for predicting each part of an output. Moreover, in these existing techniques, simplification of the structure is realized by expressing a plurality of connections present between respective clusters collectively as one connection by threshold processing. Therefore, the structure obtained using the existing technique changes greatly depending on threshold setting and it cannot be said that similar examination results are stably read from the structure. Therefore, a technique capable of obtaining similar examination results stably regardless of the setting of variables such as a threshold and quantitatively knowing the role of each cluster in a neural network is desirable.

The present invention has been made to solve the above-described problems, and an object thereof is to provide an analyzing device, method, and program capable of quantitatively analyzing the structure of a neural network.

Means for Solving the Problem

In order to attain the object, an analyzing device according to a first invention includes: an input unit that receives a neural network learned in advance for outputting output data from input data on the basis of learning data made up of the input data and the output data and a structure of a cluster made up of units calculated in advance for the neural network; and an analyzing unit that calculates, for each of combinations of a dimension of the input data and the cluster, a sum of squared errors between an output of each unit belonging to the cluster when a value of the dimension of the input data is replaced with an average value of the dimension of the input data included in the learning data and an output of each unit belonging to the cluster for the input data before replacement as a relationship between the combinations, and calculates, for each of combinations of the cluster and a dimension of the output data, a squared error between the value of the dimension of the output data when an output value of each unit belonging to the cluster is replaced with an average output value of each unit of the cluster when the input data included in the learning data was input and the value of the dimension of the output data before replacement as a relationship between the combinations.

An analyzing device according to a second invention includes: an input unit that receives a neural network learned in advance for outputting output data from input data on the basis of learning data made up of the input data of a sample and the output data indicating a dimension to which the sample belongs and a structure of a cluster made up of units calculated in advance for the neural network; an analyzing unit that calculates, for each of combinations of a dimension of the input data and the cluster, a sum of squared errors between an output of each unit belonging to the cluster when a value of the dimension of the input data is replaced with an average value of the dimension of the input data included in the learning data and an output of each unit belonging to the cluster for the input data before replacement as a relationship between the combinations, and calculates, for each of combinations of the cluster and a dimension of the output data, a squared error between the value of the dimension of the output data when an output value of each unit belonging to the cluster is replaced with an average output value of each unit of the cluster when the input data included in the learning data was input and the value of the dimension of the output data before replacement as a relationship between the combinations; and a relearning unit that adds noise corresponding to a relationship between combinations with a dimension to which a sample indicated by the output data included in the learning data to the output value of each unit belonging to each cluster on the basis of the learning data, the cluster structure, and the calculated relationship between each of the combinations of the cluster and the dimension of the output data and relearns the neural network by backpropagation.

An analyzing method according to a third invention includes and performs: a step in which an input unit receives a neural network learned in advance for outputting output data from input data on the basis of learning data made up of the input data and the output data and a structure of a cluster made up of units calculated in advance for the neural network; and a step in which an analyzing unit calculates, for each of combinations of a dimension of the input data and the cluster, a sum of squared errors between an output of each unit belonging to the cluster when a value of the dimension of the input data is replaced with an average value of the dimension of the input data included in the learning data and an output of each unit belonging to the cluster for the input data before replacement as a relationship between the combinations, and calculates, for each of combinations of the cluster and a dimension of the output data, a squared error between the value of the dimension of the output data when an output value of each unit belonging to the cluster is replaced with an average output value of each unit of the cluster when the input data included in the learning data was input and the value of the dimension of the output data before replacement as a relationship between the combinations.

An analyzing method according to a fourth invention includes and performs: a step in which an input unit receives a neural network learned in advance for outputting output data from input data on the basis of learning data made up of the input data of a sample and the output data indicating a dimension to which the sample belongs and a structure of a cluster made up of units calculated in advance for the neural network; a step in which an analyzing unit calculates, for each of combinations of a dimension of the input data and the cluster, a sum of squared errors between an output of each unit belonging to the cluster when a value of the dimension of the input data is replaced with an average value of the dimension of the input data included in the learning data and an output of each unit belonging to the cluster for the input data before replacement as a relationship between the combinations, and calculates, for each of combinations of the cluster and a dimension of the output data, a squared error between the value of the dimension of the output data when an output value of each unit belonging to the cluster is replaced with an average output value of each unit of the cluster when the input data included in the learning data was input and the value of the dimension of the output data before replacement as a relationship between the combinations; a step in which a relearning unit adds noise corresponding to a relationship between combinations with a dimension to which a sample indicated by the output data included in the learning data to the output value of each unit belonging to each cluster on the basis of the learning data, the cluster structure, and the calculated relationship between each of the combinations of the cluster and the dimension of the output data and relearn the neural network by back-propagation.

A program according to a fifth invention is a program for causing a computer to function as each unit of the analyzing device according to the first invention.

A program according to a sixth invention is a program for causing a computer to function as each unit of the analyzing device according to the second invention.

Effects of the Invention

According to the analyzing device, method, and program of the present invention, a neural network learned in advance for outputting output data from input data on the basis of learning data made up of the input data and the output data and the structure of a cluster made up of units calculated in advance for the neural network are received. Moreover, for each combination of the cluster and the dimension of the input data, the sum of squared errors between the output of each unit belonging to the cluster when the value of the dimension of the input data is replaced with an average value of the dimension of the input data included in the learning data and the output of each unit belonging to the cluster for the input data before replacement is calculated as a relationship between combinations. Moreover, for each combination of the cluster and the dimension of the output data, the squared error between the value of the dimension of the output data when the output value of each unit belonging to the cluster is replaced with an average output value of each unit of the cluster when the input data included in the learning data was input and the value of the dimension of the output data before replacement is calculated as a relationship between combinations. By doing so, it is possible to analyze the structure of a neural network quantitatively.

BRIEF DESCRIPTION OF DRAWINGS

FIG. 3 is a diagram illustrating an algorithm of a multilayer neural network.

DESCRIPTION OF EMBODIMENTS

Hereinafter, an embodiment of the present invention will be described with reference to the drawings.

<Configuration of Analyzing Device According to Embodiment of Present Invention>

Figure 1:
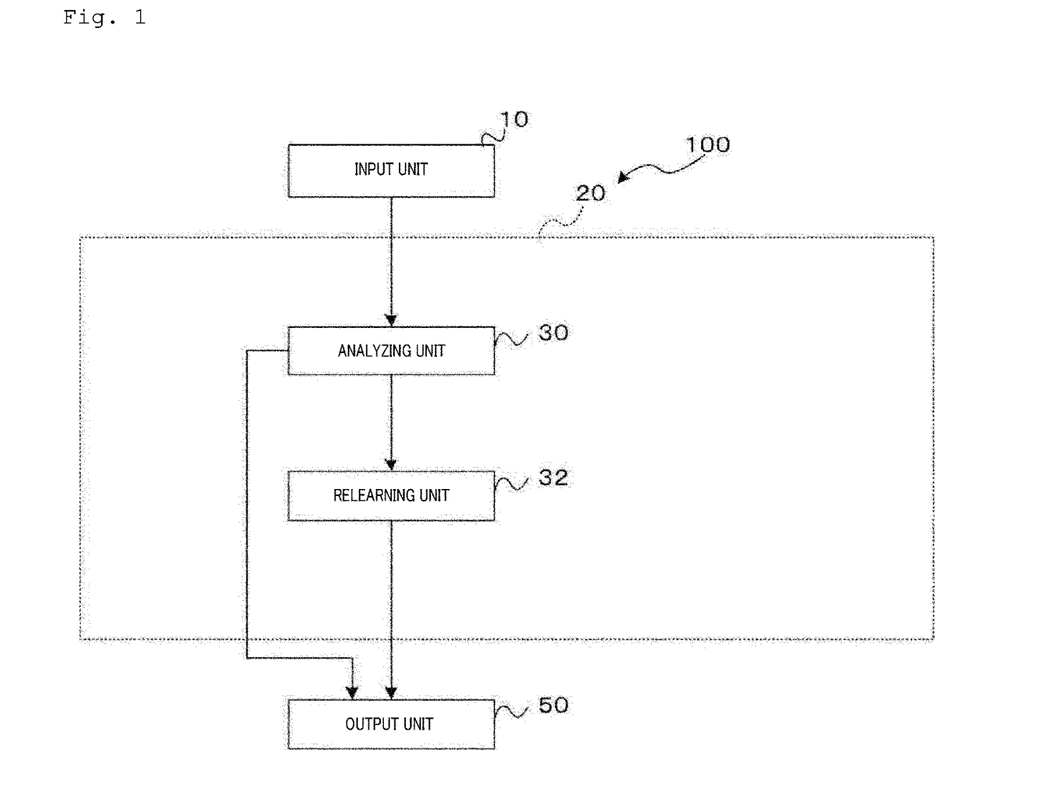
FIG. 1 is a block diagram illustrating a configuration of an analyzing device according to an embodiment of the present invention.

Next, a configuration of an analyzing device according to an embodiment of the present invention will be described. As illustrated in FIG. 1, an analyzing device 100 according to an embodiment of the present invention can be configured as a computer including a CPU, a RAM, and a ROM storing a program and various types of data for executing an analysis process routine to be described later. The analyzing device 100 functionally includes an input unit 10, an arithmetic unit 20, and an output unit 50 as illustrated in FIG. 1.

The input unit 10 receives a neural network learned in advance and a structure of a cluster made up of units calculated in advance for the neural network. Moreover, the cluster structure may be extracted by an arbitrary method. For example, in a multilayer neural network learned in advance, a community of each layer of the multilayer neural network, extracted on the basis of a connection relationship between vertices of adjacent layers, determined by each edge may be used as a cluster. Moreover, the input unit 10 receives learning data made up of input data of a sample serving as an input to the neural network and output data indicating a dimension to which the sample belongs. The neural network is learned as a neural network for outputting output data from input data on the basis of learning data made up of the input data and the output data.

The arithmetic unit 20 includes an analyzing unit 30 and a relearning unit 32.

The analyzing unit 30 calculates a relationship $v_{c,i}^{in}$ between combinations of a dimension i of input data and a cluster c and a relationship $v_{c,j}^{out}$ between combinations of the cluster c and a dimension j of output data. The calculated $v_{c,i}^{in}$ and $v_{c,j}^{out}$ indicate the strength of relationship in each combination.

Specifically, the analyzing unit 30 inputs learning data to the neural network and defines and calculates, for each combination of the cluster c and the dimension i of the input data, the sum of squared errors between the output of each unit belonging to the cluster c when the value of the dimension i of the input data which is the learning data is replaced with an average value of the dimension i of the input data included in the learning data and the output of each unit belonging to the cluster c with respect to the input data before replacement as the relationship $v_{c,i}^{in}$ between the combinations of the dimension i of the input data and the cluster c.

Moreover, the analyzing unit 30 inputs the learning data to the neural network and defines and calculates, for each combination of the cluster c and the dimension j of the output data, the squared error between the value of the dimension j of the output data when the output value of each unit belonging to the cluster c is replaced with an average output value of each unit of the cluster c when the input data included in the learning data was input and the value of the dimension j of the output data before replacement as the relationship $v_{c,j}^{out}$ between the combinations of the cluster c and the dimension j of the output data.

With the above computation, the role (the strength of relationship between input and output dimensions) of each cluster is obtained in a vector form ($v_{in}=\{v_{c,i}^{in}\}$, $v_{out}=\{v_{c,j}^{out}\}$).

Figure 2:
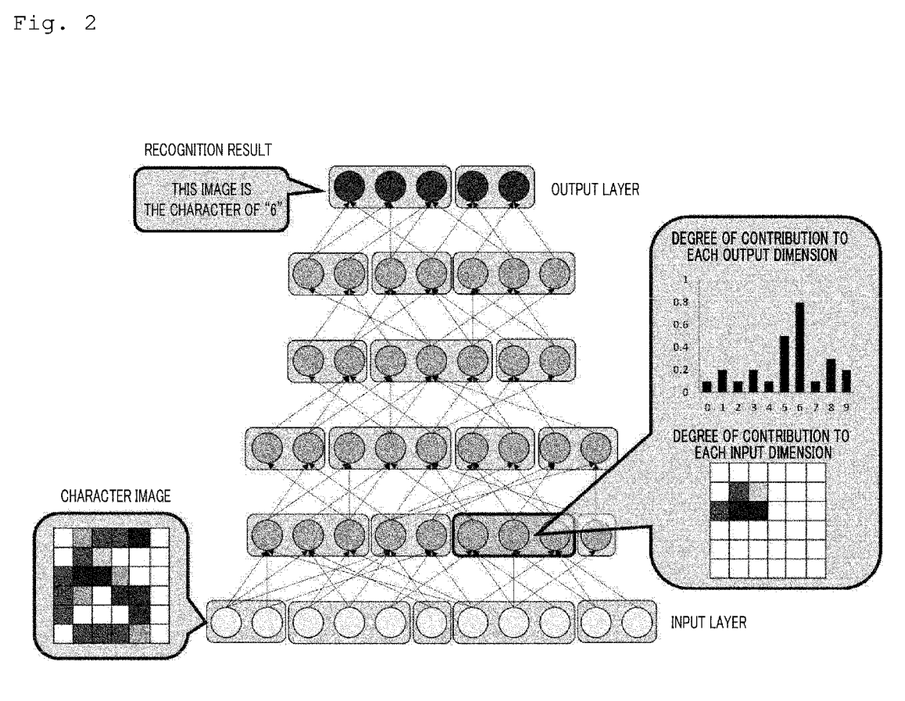
FIG. 2 is a diagram illustrating an example of a case in which a cluster structure indicates the degrees of contribution of input and output.

Moreover, the output unit 50 outputs the relationship $v_{c,i}^{in}$ between the combinations of the dimension i of the input data and the cluster c and the relationship $v_{c,j}^{out}$ between the combinations of the output data of the cluster c and the dimension j so as to be represented by a vector or a matrix so that the results can be analyzed more easily. For example, FIG. 2 in a case in which the present embodiment is applied to a neural network that recognizes a character image (a neural network receiving an image as an input and outputting the results of prediction of characters written in the image) to recognize a character image using learning data of a character image, in a cluster structure of units of a neural network, it is possible to represent the degree of contribution indicating which character the cluster is used for recognition of by representing the degree of contribution of the cluster to each output dimension in a bar graph and also possible to represent the degree of contribution indicating which part of an input data the cluster receives the information on by representing the degree of contribution of each input dimension to the cluster using a distribution of matrices as illustrated in FIG. 2.

Moreover, by relearning the parameters of the neural network on the basis of the computation results of the analyzing unit 30, it is possible to improve the generalization performance of the neural network.

The relearning unit 32 adds noise corresponding to a relationship between combinations of dimensions to which a sample indicated by the output data included in the learning data to the output value of each unit belonging to each of the clusters on the basis of the learning data, the cluster structure, and the calculated relationship $v_{c,j}^{out}$ between each of the combinations of the cluster and the dimension of the output data, relearns a neural network by backpropagation, and outputs the relearned neural network to the output unit 50.

For example, when a neural network is learned on the basis of stochastic gradient descent, a normal distribution having a variance proportional to the degree of contribution $v_{c,j}^{out}$ of the cluster to the output dimension j, corresponding to an output class (corresponding to information on a character written in an image in the case of recognition of a character image) of the dimension of the output data of the learning data selected randomly in each iteration of learning for each cluster is defined as Formula (1) below.

[Formula 1]

$$\mathcal{N}(0,\sigma_{c,j}), \sigma_{c,j} \propto v_{c,j}^{out} \qquad (1)$$

The relearning unit 32 updates parameters from a connection weight $\{\omega_{i,j}^d\}$ and a bias $\{\theta_i^d\}$ which are initialized parameters and a sample. Algorithm 1 illustrated in FIG. 3 is an example of a parameter updating method, and is backpropagation with noise based on the degree of contribution of each cluster to an output class using an output value and observation data of a multilayer neural network. When input data of learning data is input, an output class to which a sample indicated by the learning data belongs is r, and a variance proportional to the degree of contribution $v_{c,r}^{out}$ of the cluster c to the output dimension r is $\sigma_{c,r}$, noise corresponding to the normal distribution of Formula (1) is added to each unit belonging to the cluster c as illustrated on the eighth and tenth lines, an output $o_i^d$ of the unit is calculated and eventually, the neural network is updated by backpropagation.

<Operation of Analyzing Device According to Embodiment of Present Invention>

Next, an operation of the analyzing device 100 according to an embodiment of the present invention will be described. When the input unit 10 receives a neural network learned in advance, the structure of a cluster made up of units calculated in advance for the neural network, and learning data made up of input data of a sample serving as an input and output data indicating a dimension to which the sample belongs, the analyzing device 100 executes an analysis process routine illustrated in FIG. 4.

Figure 4:
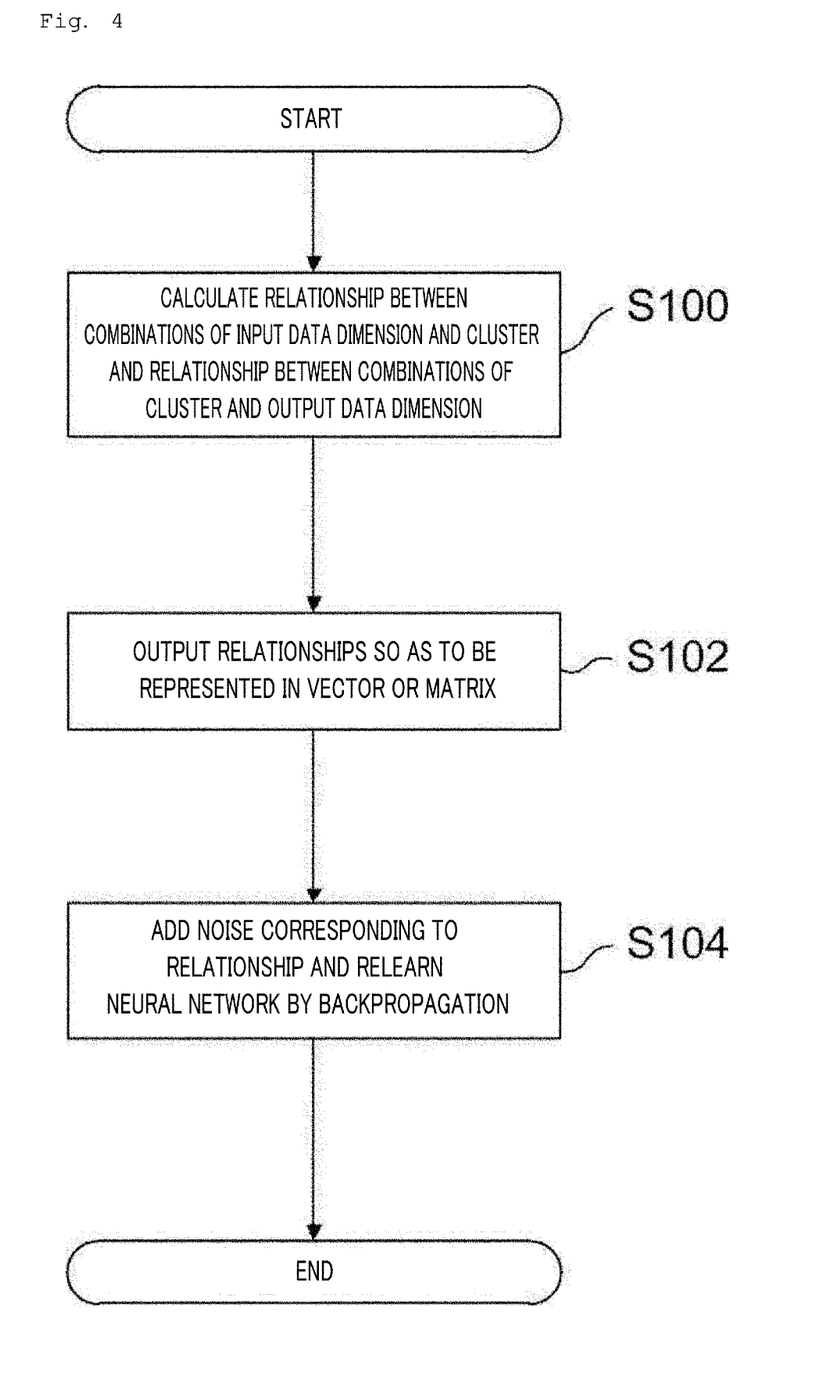
FIG. 4 is a flowchart illustrating an analysis process routine in an analyzing device according to an embodiment of the present invention.

In step S100, the analyzing unit 30 inputs learning data to a neural network and defines and calculates, for each combination of the cluster c and the dimension i of the input data which is the learning data, the sum of squared errors between the output of each unit belonging to the cluster c when the value of the dimension i of the input data is replaced with an average value of the dimension i of the input data included in the learning data and the output of each unit belonging to the cluster c with respect to the input data before replacement as the relationship $v_{c,i}^{in}$ between the combinations of the dimension i of the input data and the cluster c. Moreover, the analyzing unit 30 inputs the learning data to the neural network and defines and calculates, for each combination of the cluster c and the dimension j of the output data, the squared error between the value of the dimension j of the output data when the output value of each unit belonging to the cluster c is replaced with an average output value of each unit of the cluster c when the input data included in the learning data was input and the value of the dimension j of the output data before replacement as the relationship $v_{c,j}^{out}$ between the combinations of the cluster c and the dimension j of the output data.

In step S102, the output unit 50 outputs the relationship $v_{c,i}^{in}$ between the combinations of the dimension i of the input data and the cluster c and the relationship $v_{c,j}^{out}$ between the combinations of the output data of the cluster c and the dimension j so as to be represented by a vector or a matrix.

In step S104, the relearning unit 32 adds noise corresponding to the normal distribution of Formula (1) using the relationship $v_{c,r}^{out}$ between the combinations with the dimension r to which the sample indicated by the output data included in the learning data belongs to the output value of each unit belonging to each of the clusters c when the input data of the learning data was input on the basis of the learning data, the cluster structure, and the calculated relationship $v_{c,j}^{out}$ between each of the combinations of the cluster and the dimension of the output data, relearns a neural network by backpropagation, and outputs the relearned neural network to the output unit 50.

As described above, according to the analyzing device according to an embodiment of the present invention, a neural network learned in advance for outputting output data from input data on the basis of learning data made up of the input data and the output data and the structure of a cluster made up of units calculated in advance for the neural network are received. Moreover, for each combination of the cluster and the dimension of the input data, the sum of squared errors between the output of each unit belonging to the cluster when the value of the dimension of the input data is replaced with an average value of the dimension of the input data included in the learning data and the output of each unit belonging to the cluster for the input data before replacement is calculated as a relationship between combinations. Moreover, for each combination of the cluster and the dimension of the output data, the squared error between the value of the dimension of the output data when the output value of each unit belonging to the cluster is replaced with an average output value of each unit of the cluster when the input data included in the learning data was input and the value of the dimension of the output data before replacement is calculated as a relationship between combinations. With these calculations, it is possible to analyze the structure of a neural network quantitatively.

Using the technique of the embodiment of the present invention, it is possible to know the role of each cluster by finding out which dimensional information of input data is used by the cluster and which dimensional information of the output is inferred by the cluster. For example, as illustrated in FIG. 2, when the present technique is applied to a neural network that recognizes a character image, it is possible to know which part of an input image each cluster of the neural network looks at and which character the cluster is used for recognition of.

The present invention is not limited to the above-described embodiment, but various modifications and applications can be made without departing from the spirit of the present invention.

For example, in the above-described embodiment, although a case of including a relearning unit has been described as an example, there is no limitation thereto. For example, the arithmetic unit of the analyzing device may include an analyzing unit only, and the analyzing unit may analyze and output the relationship $v_{c,i}^{in}$ between the combinations of the cluster c and the dimension i of the input data and the relationship $v_{c,j}^{out}$ between the combinations of the cluster c and the dimension j of the output data.

REFERENCE SIGNS LIST

10: Input unit
20: Arithmetic unit
30: Analyzing unit
32: Relearning unit
50: Output unit
100: Analyzing device

The invention claimed is:

1. A computer-implemented method for improving generalization performance of a neural network, the method comprising:

receiving a neural network, wherein the neural network is a trained neural network for generating output data from input data based on a set of learning data including the input data and the output data, wherein the input data is in multi-dimensional vector form, and the neural network includes a plurality of layers;

receiving a structure of a cluster of the neural network, wherein the structure of the cluster indicates a plurality of predetermined units in a layer of the plurality of layers of the neural network, the cluster represents a set of extracted units in the layer of the plurality of layers in the trained neural network based on a connection relationship between vertices of adjacent layers of the layer according to a plurality of edges with connection weights, the plurality of edges connect respective units in the cluster with other units of the adjacent layers of the layer in the plurality of layers in the trained neural network, and the structure of the cluster is in multi-dimensional vector form;

determining a first relationship between one or more dimensions of the input data of the neural network and a dimension of the cluster, wherein the first relationship is based on a sum of squared errors between the first set of data and a second set of data, the first set of data represents output values of the respective units of the set of extracted units in the cluster using a data value of one of a plurality of dimensions of the input data in the set of learning data as input to the trained neural network, and the second set of data represents output values of the respective units of the set of extracted units in the cluster using an averaged value of data values of the plurality of dimensions of the input data in the set of learning data as input to the trained neural network;

determining a second relationship between the dimension of the cluster and a dimension of the output data of the neural network, wherein the second relationship is based on a squared error between a first data value of the dimension of the output data and a second value of the dimension of the output data, the first data value of the dimension of the output data represents output from the predetermined units in the cluster, and the second data value of the dimension of the output data represents an average data value of output from the predetermined units as the output from each of the predetermined units in the cluster; and retraining the trained neural network and improving the generalization performance of the neural network by using one or more noise data as training data, the one or more noise data correspond to at least one of the determined first relationship and the determined second relationship, and the retraining further comprises adding the one or more noise data to output from respective units of the extracted units in the cluster of the trained neural network via backpropagation.

2. The computer-implemented method of claim 1, the method further comprising:

generating one or more multi-dimensional vectors based on the first relationship and the second relationship; and providing the generated one or more multi-dimensional vectors for indicating at least one of:
a first degree of contribution by one or more dimensions of the input data to the cluster, or
a second degree of contribution by the cluster to one or more dimensions of the output data.

3. The computer-implemented method of claim 2, wherein the input data includes character image data, and wherein the generated one or more multi-dimensional vectors indicate one or more portions of the character image data being processed by the cluster and at least a character the cluster recognizes during a character recognition processing using the neural network.

4. The computer-implemented method of claim 1, the method further comprising:
generating a matrix based on the first relationship, the matrix indicating a degree of contribution by each dimension of the input data to the cluster; and
graphically displaying the matrix for an interactive analysis of data processing using the neural network.

5. The computer-implemented method of claim 1, the method further comprising:
generating a matrix based on the second relationship, the matrix indicating a degree of contribution by the cluster to each dimension of the output data of the neural network; and
graphically displaying the matrix for an interactive analysis of data processing using the neural network.

6. A system for improving generalization performance of a neural network, the system comprises:
a processor; and
a memory storing computer-executable instructions that when executed by the processor cause the system to:
receive a neural network, wherein the neural network is a trained neural network for generating output data from input data based on a set of learning data including the input data and the output data, wherein the input data is in multi-dimensional vector form, and the neural network includes a plurality of layers;
receive a structure of a cluster of the neural network, wherein the structure of the cluster indicates a plurality of predetermined units in a layer of the plurality of layers of the neural network, the cluster represents a set of extracted units in the layer of the plurality of layers in the trained neural network based on a connection relationship between vertices of adjacent layers of the layer according to a plurality of edges with connection weights, the plurality of edges connect respective units in the cluster with other units of the adjacent layers of the layer in the plurality of layers in the trained neural network, and the structure of the cluster is in multi-dimensional vector form;
determine a first relationship between one or more dimensions of the input data of the neural network and a dimension of the cluster, wherein the first relationship is based on a sum of squared errors between the first set of data and a second set of data,
the first set of data represents output values of the respective units of the set of extracted units in the cluster using a data value of one of a plurality of dimensions of the input data in the set of learning data as input to the trained neural network, and
the second set of data represents output values of the respective units of the set of extracted units in the cluster using an averaged value of data values of the plurality of dimensions of the input data in the set of learning data as input to the trained neural network;
determine a second relationship between the dimension of the cluster and a dimension of the output data of the neural network, wherein the second relationship is based on a squared error between a first data value of the dimension of the output data and a second value of the dimension of the output data,
the first data value of the dimension of the output data represents output from the predetermined units in the cluster, and
the second data value of the dimension of the output data represents an average data value of output from the predetermined units as the output from each of the predetermined units in the cluster; and
retraining the trained neural network and improving the generalization performance of the neural network by using one or more noise data as training data, the one or more noise data correspond to at least one of the determined first relationship and the determined second relationship, and the retraining further comprises adding the one or more noise data to output from respective units of the extracted units in the cluster of the trained neural network via backpropagation.

7. The system of claim 6, the computer-executable instructions when executed further causing the system to:
generate one or more multi-dimensional vectors based on the first relationship and the second relationship; and
provide the generated one or more multi-dimensional vectors for indicating at least one of:
a first degree of contribution by one or more dimensions of the input data to the cluster, or
a second degree of contribution by the cluster to one or more dimensions of the output data.

8. The system of claim 7, wherein the input data includes character image data, and wherein the generated one or more multi-dimensional vectors indicate one or more portions of the character image data being processed by the cluster and at least a character the cluster recognizes during a character recognition processing using the neural network.

9. The system of claim 6, the computer-executable instructions when executed further causing the system to:
generate a matrix based on the first relationship, the matrix indicating a degree of contribution by each dimension of the input data to the cluster; and
graphically display the matrix for an interactive analysis of data processing using the neural network.

10. The system of claim 6, the computer-executable instructions when executed further causing the system to:
generate a matrix based on the second relationship, the matrix indicating a degree of contribution by the cluster to each dimension of the output data of the neural network; and
graphically display the matrix for an interactive analysis of data processing using the neural network.

11. A computer-readable non-transitory recording medium storing computer-executable instructions that when executed by a processor cause a computer system to:
receive a neural network, wherein the neural network is a trained neural network for generating output data from input data based on a set of learning data including the input data and the output data, wherein the input data is in multi-dimensional vector form, and the neural network includes a plurality of layers;
receive a structure of a cluster of the neural network, wherein the structure of the cluster indicates a plurality of predetermined units in a layer of the plurality of layers of the neural network, the cluster represents a set of extracted units in the layer of the plurality of layers in the trained neural network based on a connection relationship between vertices of adjacent layers of the layer according to a plurality of edges with connection weights, the plurality of edges connect respective units in the cluster with other units of the adjacent layers of the layer in the plurality of layers in the trained neural network, and the structure of the cluster is in multi-dimensional vector form;

determine a first relationship between one or more dimensions of the input data of the neural network and a dimension of the cluster, wherein the first relationship is based on a sum of squared root errors between the first set of data and a second set of data, the first set of data represents output values of the respective units of the set of extracted units in the cluster using a data value of one of a plurality of dimensions of the input data in the set of learning data as input to the trained neural network, and the second set of data represents output values of the respective units of the set of extracted units in the cluster using an averaged value of data values of the plurality of dimensions of the input data in the set of learning data as input to the trained neural network;

determine a second relationship between the dimension of the cluster and a dimension of the output data of the neural network, wherein the second relationship is based on a squared error between a first data value of the dimension of the output data and a second value of the dimension of the output data, the first data value of the dimension of the output data represents output from the predetermined units in the cluster, and the second data value of the dimension of the output data represents an average data value of output from the predetermined units as the output from each of the predetermined units in the cluster; and retrain the trained neural network and improving the generalization performance of the neural network by using one or more noise data as training data, the one or more noise data correspond to at least one of the determined first relationship and the determined second relationship, and the retraining further comprises adding the one or more noise data to output from respective units of the extracted units in the cluster of the trained neural network via backpropagation.

12. The computer-readable non-transitory recording medium of claim 11, the computer-executable instructions when executed further causing the system to:

generate one or more multi-dimensional vectors based on the first relationship and the second relationship; and provide the generated one or more multi-dimensional vectors for indicating at least one of:
  a first degree of contribution by one or more dimensions of the input data to the cluster, or
  a second degree of contribution by the cluster to one or more dimensions of the output data.

13. The computer-readable non-transitory recording medium of claim 12, wherein the input data includes character image data, and wherein the generated one or more multi-dimensional vectors indicate one or more portions of the character image data being processed by the cluster and at least a character the cluster recognizes during a character recognition processing using the neural network.

14. The computer-readable non-transitory recording medium of claim 11, the computer-executable instructions when executed further causing the system to:

generate a first matrix based on the first relationship, the first matrix indicating a degree of contribution by each dimension of the input data to the cluster;

graphically display the first matrix for an interactive analysis of data processing using the neural network;

generate a second matrix based on the second relationship, the second matrix indicating a degree of contribution by the cluster to each dimension of the output data of the neural network; and graphically display the second matrix for an interactive analysis of data processing using the neural network.

\* \* \* \* \*